United States Patent [19]

Frierson et al.

[11] 3,864,193
[45] Feb. 4, 1975

[54] ELASTIC SHEET HAVING THE APPEARANCE OF STAINED GLASS

[75] Inventors: William Frierson; Jerome Oberwager, both of Great Neck, N.Y.

[73] Assignee: National Teaching Aids, Inc., Garden City Park, N.Y.

[22] Filed: Dec. 22, 1972

[21] Appl. No.: 317,748

[52] U.S. Cl........................ 161/2, 161/5, 161/111, 260/37, 264/211, 264/176
[51] Int. Cl............................................. B44f 1/06
[58] Field of Search............ 161/5, 2, 111; 156/244, 156/298; 264/75, 176 R, 177 R, 211; 260/37 R, 37 NP, 37 P; 8/4

[56] References Cited
UNITED STATES PATENTS

| | | | |
|---|---|---|---|
| 3,239,364 | 3/1966 | Carlisle et al. | 117/9 |
| 3,310,619 | 3/1967 | Slosberg | 264/77 |
| 3,515,619 | 6/1970 | Barnette | 161/5 |

Primary Examiner—Thomas J. Herbert, Jr.
Assistant Examiner—Bruce H. Hess
Attorney, Agent, or Firm—Gottlieb, Rackman, Reisman & Kirsch

[57] ABSTRACT

There is disclosed a method for making a plastic sheet which has optical properties of stained glass. Dispersed throughout the base resin granules in an extruder hopper there are reground resin particles having a higher melting temperature. The extruder is operated at a temperature just at or slightly below the melting temperature of the reground particles. These particles are only partially melted and appear as random lumps and irregularities in the extruded sheet. The sheet is attached to a temporary semi-rigid backing after first forming a festoon and heating it to relax local stresses, and then combing it.

7 Claims, 4 Drawing Figures

ELASTIC SHEET HAVING THE APPEARANCE OF STAINED GLASS

This invention relates to translucent colored plastic sheets and a method for making same, and more particularly to colored plastic sheets having optical properties similar to those of stained glass.

Traditionally, stained glass has been made manually by blowing a large bubble or cylinder, cutting it open, and then flattening it. The process produces imperfect glass of uneven cross-section. The surface of the glass is wavy and contains bubble inclusions, lumps, streaks and color variations. These "imperfections" are what impart the beauty to stained glass because of the unique refraction effects which they produce as light rays pass through the glass. Other methods of glass making have for the most part replaced the traditional methods.

Stained glass is difficult to handle and use, and it is expensive to purchase. These are the main reasons why stained glass is not used to a much greater extent by artists, architects, hobbyists and others.

It is a general object of our invention to provide a translucent colored plastic sheet whose optical properties approximate those of stained glass, but which is less expensive to produce and is easier to use.

The colored plastic sheet of the invention is marketed by the assignee of this application under the trademark Stained Vinyl-Glass (hereinafter referred to as Vinyl-Glass sheets).

The conventional process for making extruded vinyl plastic sheets is to load plastic resin granules, together with a sufficient amount of plasticizer and colorant, in an extrusion hopper. The mixture is melted and forced out of a horizontal narrow slit. The extruded sheet is then cooled and wound on a roll. That basic process is also used in the making of Vinyl-Glass plastic sheets.

But, in accordance with the principles of the invention, another ingredient is added to the extrusion hopper. A small percentage of the total charge in the hopper (typically, less than 2% and preferably one-fourth – one-half percent) is reground extruded vinyl. The reground material can be obtained by grinding up a previously extruded plastic sheet. The reground particles should be small, the maximum size being no greater than approximately one-sixteenth inch × one-sixteenth inch × one-sixteenth inch. The reground material must have a melting temperature which is higher than the melting temperature of the "virgin" or base resin granules.

In a typical case, the temperature of the plastic mixture is just slightly below the melting temperature of the reground material. The important operating criterion is that at the exit slit of the extruder the virgin resin should be completely melted (as in the prior art); however, the individual reground particles which are dispersed throughout the virgin material should not be completely melted. While the surface of each reground particle should be melted, its inner core should not be. By not allowing the small percentage of particles having the higher melting temperature to melt completely, they impart optical properties to the extruded sheet which approximate those of stained glass.

One important use of the colored plastic sheets which can be made in accordance with the principles of our invention is in the construction of works of art which simulate stained-glass windows. Kits for making such works of art are marketed by the assignee of this application, and are described in copending application Ser. No. 317,749, entitled "KIT FOR MAKING WORK OF ART HAVING THE APPEARANCE OF A STAINED-GLASS WINDOW" and filed simultaneously herewith in the name of Jerome Oberwager, now U.S. Pat. No. 3,815,263.

As described in that application, in order that the use of adhesives not be required when using Vinyl-Glass sheets, the sheets should be self-adhering. This can be achieved by including a sufficient amount of plasticizer with the resin to be extruded. But while the inherent "stickiness" of the extruded sheets are advantageous in holding together a finished product without requiring adhesives, it is apparent that it is difficult to handle such a sheet, or a group of such sheets (several differently colored sheets are provided in a typical one of the kits referred to above), because the sheets stick to any smooth surface and to each other. For this reason, it is highly desirable to provide a backing for each sheet. Such a backing adds stiffness to the sheet and makes the sheet much easier to handle. Also, as described in the above-identified application, in many situations it is desirable to print or draw a pattern on the backing so that predetermined shaped sections can be cut from a particular Vinyl-Glass sheet. Due to the mechanical and chemical properties of the plastic sheet itself, it may be difficult to print directly on it with conventional equipment. But there is no comparable problem in printing on the backing.

One side of the backing should be polished so that the Vinyl-Glass sheet adheres to it. In the case of a paper backing, to achieve the necessary polished surface it may be necessary to use a plastic-coated paper. The polished surface must be compatible with the Vinyl-Glass sheet, that is, it should not be significantly affected by the migration of plasticizer from the Vinyl-Glass sheet to it. The other side of the backing should be unpolished to prevent adhesion with other Vinyl-Glass sheets with which it may come into contact and it should be receptive to printing and drawing materials. A preferred backing is a bleached white paper with a polyethylene polished coating.

However, it is no simple matter to combine the extruded plastic sheet of our invention with a paper backing. In passing over the conventional rollers which are found in present day combining machines, a plastic sheet is placed under tension. Since the plastic sheet and the paper backing have different stretch characteristics, when the plastic subsequently relaxes after it is attached to the paper backing, it can distort the finished product.

In accordance with an aspect of our invention, the plastic sheet is drawn off a roll in the combining apparatus. It is necessarily placed under tension and non-uniform stresses are set up in the sheet. But before the sheet is made to bear against a paper backing, it is allowed to form a festoon for the purpose of relaxing the tension introduced into the material during extrusion windup and when the sheet is drawn off the roll. Since the desired characteristics of the plastic sheet require it to have variations in thickness, the diameter of the roll varies along its axis. As a result, the festoon does not have a uniform cross-section; it exhibits bulges. Heat and air are selectively applied to the sheet in the festoon region in a plane perpendicular to the long axis of the roll to produce localized shrinkage, minimizing the variations in festoon cross-section. As the plastic sheet continues to travel toward the output rollers of the apparatus which actually fix it to the paper backing, it passes over a roller whose surface speed is less than the surface speed of the material. As a result of the difference in speeds, the material slips over the roller. This imparts a "combing" action which eliminates unwanted wrinkles in the material that are formed in the festoon without reintroducing unwanted tension.

Further objects, features and advantages of our invention will become apparent upon consideration of the following detailed description in conjunction with the drawing, in which.

Figure 1:
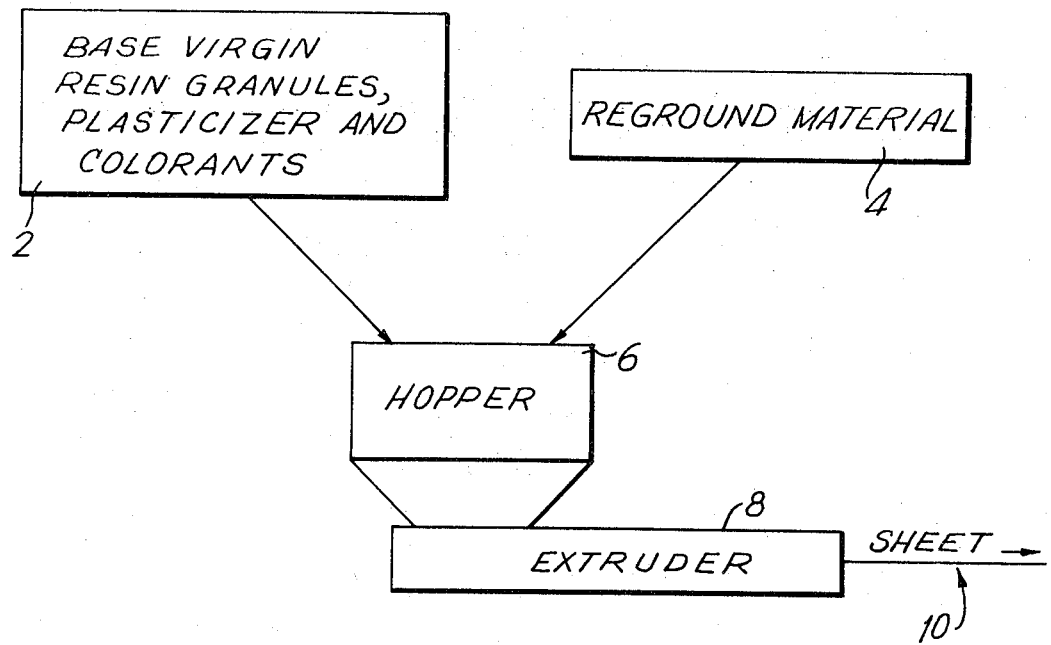
FIG. 1 depicts symbolically a conventional extruding machine which can be used for making the colored plastic sheets of our invention.

The extruder apparatus of FIG. 1 is shown only symbolically because it is conventional in all respects. Raw material which is fed into hopper 6 is melted and forced through a slit at the output end of extruder 8. The material leaves the extruder in the form of a sheet 10. In a typical installation, it is then cooled and wound up in a roll.

Typically, into hopper 6 there is fed base virgin resin granules, together with plasticizer and colorant materials, shown symbolically in FIG. 1 by numeral 2. The resin granules for making Vinyl-Glass sheets as described above are polyvinyl chloride. Preferably, the resin is highly plasticized so that it is "tacky" and adheres to clean, smooth surfaces without the need for any adhesives.

In accordance with the principles of our invention, reground material is added to the contents of the hopper, as shown symbolically by numeral 4. In the case of Vinyl-Glass sheets, the reground material is also made of polyvinyl chloride. The reground material consists of particles whose sizes vary up to approximately one-sixteenth inch × one-sixteenth inch × one-sixteenth inch. The reground material may be derived from extruding a plastic sheet and then grinding up the finished sheet. Instead of first extruding a sheet and then grinding it up, it is also possible to use "old" sheets which may be on hand. The key point here is that the melting temperature of the reground material must be higher than that of the virgin resin granules.

The melting temperature of the reground material depends on the amount of plasticizer which is used in extruding it in the first place, and/or the age of the sheet since it is known that the melting temperature of a sheet of plastic increases with age. Typically, the base virgin resin melts at a temperature in the range 280°290°300° F., while the melting temperature of the reground material is in the range of 290°–380° F. In most cases, the temperature of the mixture is maintained slightly below the melting temperature of the reground resin; in no case should the temperature exceed this melting temperature. Preferably, the operating temperature is within 10° of the melting temperature of the virgin material, to produce what is normally objected to as a "cold extrusion." The temperature of the mixture is varied while observing the output sheet from the extruder. If the individual particles having the higher melting temperature are not completely melted by the time they exit the extruder, then these particles produce little lumps or irregularities in the resultant extruded sheet — and in a random fashion — both in regard to the dispersion of the lumps and irregularities throughout the surface of the material and in the size and thickness of the lumps and irregularities. The temperature is adjusted until the plastic sheet exhibits the optical properties of stained glass.

There is another important effect of maintaining the temperature of the extruder at approximately the melting temperature of the virgin resin. The base resin exits from the slit at the output of the extruder together with some slower moving islands of partially melted reground material. This uneven flow produces an uneven thickness and coloration in the extruded sheet, and the sheet exhibits striations, streaks and a crystalline appearance which closely resembles stained glass. At the leading edge of the unmelted particles, the sheet material thins out to produce the effect of air bubbles in glass.

In general, transparent pigments are used as the colorants. The amount of the coloring should be such that the finished material is translucent; if an object is viewed through the sheet, light from it is so scattered by the sheet that the image seen cannot be perceived clearly.

A single sheet may be fabricated by utilizing different shades of the same color for the virgin and reground vinyl materials. In such a case, two-tone effects can be achieved, for example, dark blue streaks on a light blue background. Similarly, different color resins can be used as the virgin and reground materials, producing unusual multi-colored shading effects, for example, a red and orange combination. All of the effects are achieved because by preventing the complete melting of the reground material, this material is not dispersed uniformly throughout the bulk of the sheet.

Figure 2:
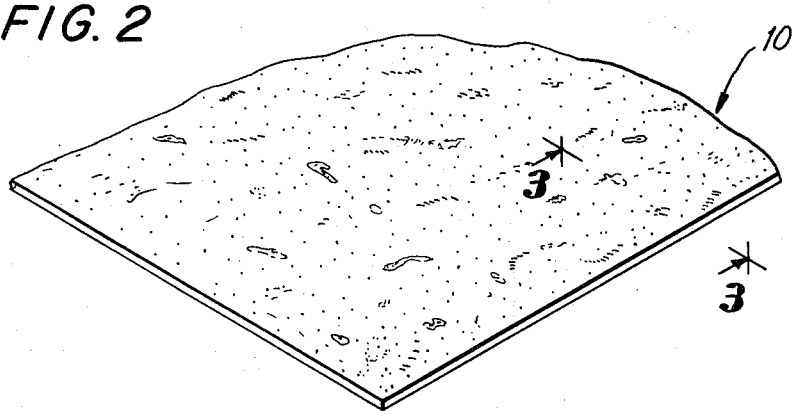
FIG. 2 depicts a perspective view of a plastic sheet constructed using the apparatus of FIG. 1.
Figure 3:
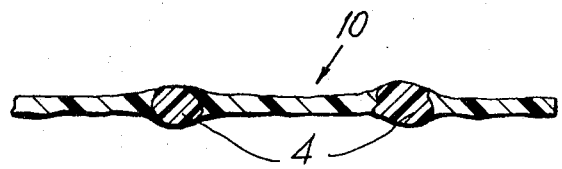
FIG. 3 is a sectional view taken along line 3—3 of FIG. 2.

FIGS. 2 and 3 depict the extruded sheet. It is difficult to represent the appearance of the sheet, particularly without representing different shades of color. A complete appreciation of our invention can be obtained by examining the Vinyl-Glass sheets supplied in the kits referred to above. In general, an examination of the sheets indicates that there are approximately 15 –50 irregularities per square inch, and there is a negligible number of areas greater than one-fourth inch × one-fourth inch which exhibit a substantially uniform thickness, color and texture. The average thickness of the sheet is .007 inches but, as shown by the numeral 4 in FIG. 3, the unmelted particle lumps may protrude on both sides to a thickness of one-sixteenth inch.

The colored plastic sheets made in accordance with our invention can be used in hobby kits, but they also find application as creative art materials. For example, the sheets can be used to make realistic mock-ups or substitutes for real stained-glass windows. By superimposing two or more sheets, the intensity and hue of the sheets can be varied. In general, there are many uses for the plastic sheet of FIGS. 2 and 3 which will be apparent to artists, architects, hobbyists and other persons.

Although not shown in FIG. 1, an extruded sheet is typically wound up on a roll (as is the case in a conventional sheet extrusion installation). Since the vinyl extruded sheet is "tacky" it is very difficult to handle. For this reason, it is highly desirable to provide a suitably coated smooth surface paper or some other backing on the sheets. This can be accomplished by drawing off material from a paper roll while at the same time drawing off material from a roll of plastic sheet, and pressing the two against each other, the combined product then being cut into separate sheets. But the very act of drawing off the plastic material from a roll stretches it; this is particularly true of Vinyl-Glass material since each layer of the roll adheres to the layer underneath it and thus more than the usual force is required to unwind the roll. Subsequent relaxation of the plastic sheet after it is attached to the paper backing distorts the finished product unless measures are taken to prevent it.

Figure 4:
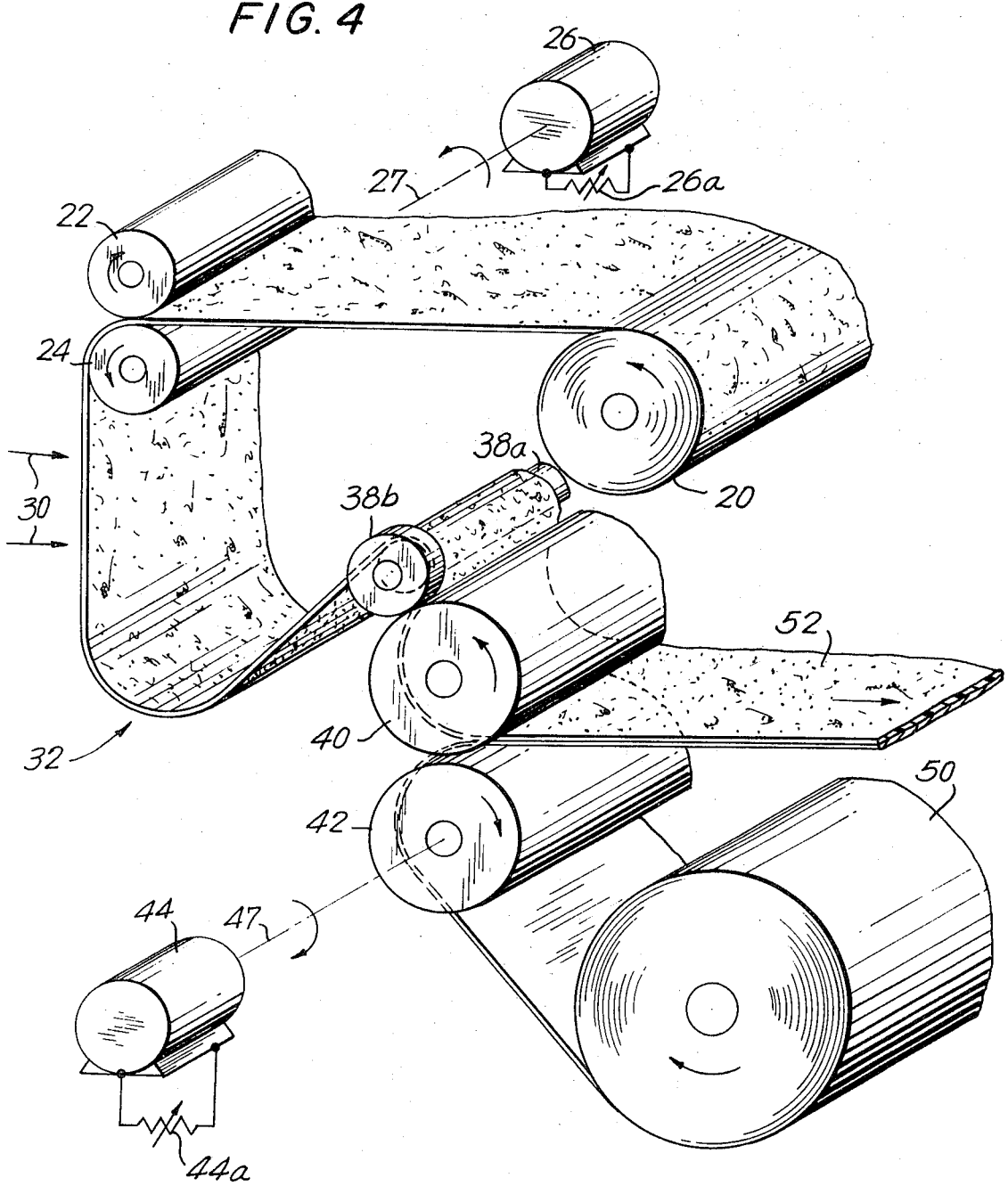
FIG. 4 depicts the apparatus of our invention for combining a plastic sheet with a backing material.

An improved combining apparatus is depicted in FIG. 4. The plastic material is drawn off roll 20 by idler 22 and polished roller 24. Roller 24 is driven by motor 26, as symbolized by line 27. The motor speed is adjustable, as shown by potentiometer 26a. As the sheet material exits roller 24, it is allowed to form a festoon as shown by the numeral 32. As shown by the numeral 30, hot air is blown against the sheet in selected areas. (Other heating techniques such as the use of infra-red lamps can be used.) The material shrinks in the region of the applied heat. The sheet then passes over roller 38a and between rollers 40, 42. Paper from roll 50 is fed around roller 42 where it is joined so that the coated side of the paper is in contact with the plastic sheet, the combined material being shown by numeral 52 as it exits from rollers 40, 42. Roller 42 is driven by motor 44 as shown by line 47. The motor speed is adjustable as shown by potentiometer 44a.

Roller 38a is provided with a large diameter end 38b which bears against one end of roller 40. Roller 40 is driven by roller 42, and roller 38a, 38b is driven by roller 40. Since the surface speeds of rollers 38b and 40 are the same, and the diameter of roller 38a is less than that of roller 38b, the surface speed of roller 38a is less than that of roller 40. Since the plastic sheet moves at the surface speed of roller 40, it is apparent that even though roller 38a rotates in the direction of the moving plastic sheet, its surface speed is less than that of the plastic sheet. As a result, the plastic sheet must slip over roller 38a. This imparts a combing action to the plastic sheet which eliminates unwanted material wrinkles which may be formed in the festoon.

The surface speed of roller 24 is greater than the surface speed of rollers 40 and 42 by a factor which typically ranges from 1.01 to 1.05. This is necessary to compensate for the shrinkage of the plastic sheet in the festoon. The speeds of motors 26 and 44 can be adjusted until the increased speed of roller 24 over rollers 40, 42 just compensate for the material shrinkage in the festoon. In such a case, the length of the plastic sheet in the festoon will remain constant. The shape of the festoon can be changed by momentarily slowing or speeding up one of the two motors, the motor speeds thereafter being adjusted to maintain a constant shape festoon.

It has also been found advantageous to control the heat which is applied to the plastic material in the festoon perpendicular to the width of the plastic sheet in selected areas. For example, suppose it is found that the plastic material in the combined product wrinkles in the middle of the sheet. This means that the plastic material which is drawn from roll 20 is pre-stretched in the area of its center line and that it must be heat shrunk or annealed to a greater extent in this vicinity. Thus heating should be applied in the middle of the drawn off sheet. The selective application of heat across the width of the drawn off sheet can be controlled by providing several different blowers across the width of the sheet in the area of the festoon, each of which can be individually located and controlled.

Although the surface of roller 24 should be polished to provide pull, through adhesion, to the "tacky" material from roll 20, all other rollers in contact with the plastic sheet should be unpolished to prevent adhesion of the plastic sheet to them.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A vinyl plastic sheet having optical properties of stained glass, said sheet being an extruded plastic sheet obtained by extruding base vinyl plastic material containing therein partially melted particles having a higher melting temperature than the base material of the sheet, said particles representing less than 2% of the total volume of the sheet and being dispersed therein such that there is a negligible number of areas greater than one-fourth inch × one-fourth inch which exhibit a substantially uniform thickness, color and texture.

2. A plastic sheet in accordance with claim 1 wherein said particles are reground plastic material.

3. A plastic sheet in accordance with claim 1 wherein the volume of said particles is in the range one-fourth – one-half percent of the total volume of the plastic sheet.

4. A plastic sheet in accordance with claim 1 wherein said particles have a color which is different from the color of the base material of the sheet.

5. A plastic sheet in accordance with claim 1 wherein said sheet is a "cold" extruded sheet.

6. A plastic sheet in accordance with claim 5 wherein some of said particles extend through said sheet from one surface thereof to the other.

7. A plastic sheet in accordance with claim 1 wherein some of said particles extend through said sheet from the surface thereof to the other.

* * * * *